United States Patent
Stojetz et al.

(10) Patent No.: US 11,086,138 B2
(45) Date of Patent: Aug. 10, 2021

(54) METHOD OF AUTOSTEREOSCOPIC IMAGING AND AUTOSTEREOSCOPIC ILLUMINATION UNIT

(71) Applicant: OSRAM Opto Semiconductors GmbH, Regensburg (DE)

(72) Inventors: Bernhard Stojetz, Wiesent (DE);
Alfred Lell, Maxhütte-Haidhof (DE);
Christoph Eichler, Donaustauf (DE);
Andreas Löffler, Neutraubling (DE);
Harald König, Bernhardswald (DE);
André Somers, Obertraubling (DE);
Clemens Vierheilig, Tegernheim (DE)

(73) Assignee: OSRAM OLED GmbH, Regensburg (DE)

( * ) Notice: Subject to any disclaimer, the term of this patent is extended or adjusted under 35 U.S.C. 154(b) by 338 days.

(21) Appl. No.: 16/320,550

(22) PCT Filed: Jul. 24, 2017

(86) PCT No.: PCT/EP2017/068659
§ 371 (c)(1),
(2) Date: Jan. 25, 2019

(87) PCT Pub. No.: WO2018/019776
PCT Pub. Date: Jan. 2, 2018

(65) Prior Publication Data
US 2019/0235261 A1    Aug. 1, 2019

(30) Foreign Application Priority Data

Jul. 25, 2016 (DE) ............. 10 2016 113 669.7

(51) Int. Cl.
*H04N 13/30* (2018.01)
*G02B 30/27* (2020.01)
(Continued)

(52) U.S. Cl.
CPC ............. *G02B 30/27* (2020.01); *G02B 30/24* (2020.01); *G02B 30/35* (2020.01); *H04N 13/305* (2018.05); *H04N 13/307* (2018.05); *H04N 13/32* (2018.05)

(58) Field of Classification Search
CPC ........ G02B 30/27; G02B 30/24; G02B 30/35; G02B 30/00; G02B 30/10; G02B 30/20;
(Continued)

(56) References Cited

U.S. PATENT DOCUMENTS 5,365,294 A    11/1994  Anderson
8,159,528 B2 *  4/2012  Takayoshi ............. G02B 30/27
                                                                348/51
(Continued)

FOREIGN PATENT DOCUMENTS

DE            69825572         8/2005
DE      10 2009 032 886         2/2011
(Continued)

OTHER PUBLICATIONS

"Autostereoscopy"—Wikipedia, the free encyclopedia printout, 5 pages.
(Continued)

*Primary Examiner* — Marin Pichler
*Assistant Examiner* — Henry A Duong
(74) *Attorney, Agent, or Firm* — DLA Piper LLP (US)

(57) ABSTRACT

A method of autostereoscopic imaging including providing an autostereoscopic illumination unit including a lens field composed of a multiplicity of individual lenses or concave mirrors, and modulating an emission characteristic of the light source such that the individual lenses or the concave mirrors are illuminated only partly by the light source, wherein light from the light source impinges on the individual lenses or concave mirrors such that an emission
(Continued)

characteristic of a three-dimensional object is imitated, the lens field extends over a spatial angle range of at least 2 sr relative to the light source or an external observer, the individual lenses or concave mirrors are distributed over the lens field and are at least partially sequentially irradiated, and the light source is formed by one or more lasers and the laser or each of the lasers irradiates/irradiate only one of the individual lenses at a specific point in time.

17 Claims, 10 Drawing Sheets

(51) Int. Cl.
*H04N 13/305* (2018.01)
*H04N 13/32* (2018.01)
*H04N 13/307* (2018.01)
*G02B 30/24* (2020.01)
*G02B 30/35* (2020.01)

(58) Field of Classification Search
CPC ........ G02B 30/22; G02B 30/26; G02B 30/28; G02B 30/29; G02B 30/30; G02B 30/31; G02B 30/32; G02B 30/33; G02B 30/34; G02B 30/36; G02B 30/40; H04N 13/32; H04N 13/307; H04N 13/305; H04N 13/302; H04N 13/317
USPC ........................................ 359/463
See application file for complete search history.

(56) References Cited

U.S. PATENT DOCUMENTS

| 2011/0043611 | A1 | 2/2011 | Javidi et al. |
| 2012/0127571 | A1 | 5/2012 | Kanzaki et al. |
| 2012/0176665 | A1 | 7/2012 | Song et al. |
| 2013/0063421 | A1* | 3/2013 | Yoon .................... H04N 13/305 345/419 |
| 2016/0370695 | A1* | 12/2016 | Miyasaka .............. G03B 21/14 |

FOREIGN PATENT DOCUMENTS

| DE | 10 2011 053 037 | 2/2013 |
| EP | 2 802 148 | 12/2014 |
| WO | 2004/086122 | 10/2004 |
| WO | 2004/088995 | 10/2004 |

OTHER PUBLICATIONS

Reitterer, J. et al.: "Design and Evaluation of a Large-Scale Autostereoscopic Multi-View Laser Display for Outdoor Application," *Optics Express*, Nov. 2014, vol. 22, No. 22, pp. 6.

Jason Geng; "Three-Dimensional Display Technologies," *Advances in Optics and Photonics*, Nov. 22, 2013, pp. 456-535.

Jisoo Hong et al.: "Three-Dimensional Display Technologies of Recent Interest: Principles, Status and Issues [Invited]," *Applied Optics*, Dec. 2011, vol. 50, No. 34, pp. H87-H115.

* cited by examiner

METHOD OF AUTOSTEREOSCOPIC IMAGING AND AUTOSTEREOSCOPIC ILLUMINATION UNIT

TECHNICAL FIELD

This disclosure relates to a method of autostereoscopic imaging and an autostereoscopic illumination unit.

BACKGROUND

There is a need to provide a method by which three-dimensional images can be displayed without external aids such as 3D spectacles.

SUMMARY

We provide method of autostereoscopic imaging including: providing an autostereoscopic illumination unit including at least one light source and including a lens field composed of a multiplicity of individual lenses or a multiplicity of concave mirrors, and modulating an emission characteristic of the light source such that the individual lenses or the concave mirrors are illuminated only partly by the light source, wherein light from the light source impinges on the individual lenses or concave mirrors such that by the individual lenses or concave mirrors an emission characteristic of a three-dimensional object to be displayed is imitated, the lens field extends over a spatial angle range of at least 2 sr relative to the light source or an external observer, the individual lenses or concave mirrors are distributed over the lens field, the individual lenses or concave mirrors are at least partially sequentially irradiated, and the light source is formed by one or more lasers and the laser or each of the lasers irradiates/irradiate only one of the individual lenses at a specific point in time.

We also provide an autostereoscopic illumination unit including at least one light source, a lens field formed continuously from a multiplicity of individual lenses configured as converging lenses, and control electronics, wherein the light source is configured to only partially illuminate each one of the individual lenses.

We further provide a method of autostereoscopic imaging including: providing an autostereoscopic illumination unit comprising at least one light source and comprising a lens field composed of a multiplicity of individual lenses or a multiplicity of concave mirrors, and modulating an emission characteristic of the light source such that the individual lenses or the concave mirrors are illuminated only partly by the light source, wherein light from the light source impinges on the individual lenses or concave mirrors such that by the individual lenses or concave mirrors an emission characteristic of a three-dimensional object to be displayed is imitated, the lens field extends over a spatial angle range of at least 2 sr relative to the light source or an external observer, the individual lenses or concave mirrors are distributed over the lens field, and the individual lenses or concave mirrors are at least partially sequentially irradiated.

LIST OF REFERENCE SIGNS 1 autostereoscopic illumination unit
2 light source
22 mirror
24 fibre coupling
3 lens field
33 individual lens
34 light entrance surface
35 light exit surface
4 virtual image of a three-dimensional object to be displayed
5 real image of a three-dimensional object to be displayed
55 camera
56 screen
6 beam bundle
6' forbidden beam bundle
60 beam bundle node
7 detector
8 control electronics
9 viewer
L longitudinal axis
R rotational direction

DETAILED DESCRIPTION

Our method is set up for autostereoscopic imaging. This means that the method generates images having a realistic three-dimensional impression, for example, in a cinema, an exposition, a museum, in game consoles, in television sets or portable imaging units such as projectors. "Autostereoscopically" means that the three-dimensional image is displayed without the aid of additional equipment such as spectacles on the side of the observer. Therefore, autostereoscopy is also referred to as a spectacle-less representation of 3D images.

We provide an autostereoscopic illumination unit. The illumination unit comprises one or more light sources that generate light with which the three-dimensional image is displayed. The at least one light source is formed, for example, by a light-emitting diode, LED for short, a laser or a laser projector having a moving light beam, also referred to as a flying spot projector, a white light source, in particular with a blue-emitting laser in conjunction with a phosphor, a white light source made of red, green and blue-emitting lasers, an incandescent lamp, a gas discharge lamp, a plasma display and/or a liquid crystal display, LCD for short. Apart from a plasma display, in particular, it is possible for an LCD to be used in or on the light source.

The illumination unit may comprise a lens field. The lens field is composed of many individual lenses. In this example, the individual lenses can be arranged closely together in the lens field, for example, in a regular matrix, in particular a rectangular or hexagonal matrix. The individual lenses can be identical to one another or can have shapes different from one another in different regions of the lens field. Instead of individual lenses, individual reflectors can also be used, in particular reflecting concave mirrors. The statements made below for individual lenses apply in the same way to concave mirrors. Even if concave mirrors and no individual lenses are present, the term 'lens field' is nevertheless used below for the purpose of simplification.

If the lens field is composed of individual lenses, thus, the viewer and the light source are preferably located on different sides of the lens field. If, on the other hand, the lens field is composed of concave mirrors, thus, the viewer and the light source are preferably located on the same side of the lens field.

In addition, it is possible for the concave mirrors to be semi-transparent. A virtual reality effect and/or enhanced reality effect is thus made possible so that the observer can perceive the actual environment on the one hand and the three-dimensional image of the illumination unit on the other hand. A matching or superimposition between the actual environment and the three-dimensional image can be regulated via optional additional sensors of the illumination unit.

The lens field may be convexly curved seen from the exterior. In contrast, the lens field may be concavely curved when viewed from the light source. In other words, it is possible, seen from an external viewer, that a middle region of the lens field is closer to the viewer than edges of the lens field. The opposite can apply from the point of view of the light source, wherein alternatively the lens field can have an invariant, constant distance from the light source, in particular seen in one or in a plurality of sectional planes through the lens field and through the light source.

Alternatively or additionally, "convex" can mean that the lens field can be approximated by a circular arc, a circle, an ellipse or a parabola, in one or in all sectional planes which preferably run horizontally, and that a center of curvature and/or a focal point of this approximated curve lies on a side of the lens field facing away from the observer. "Concave" can correspondingly mean that the center of curvature and/or the focal point and the light source are located on the same side of the lens field. "Approximated" can mean that the approximated curve deviates locally from the lens field by at most 25% or 15% or 5% of a focal length or a radius of the approximated curve. The lens field can thus be formed by a single continuous curvature, viewed in cross section, or by a plurality of differently curved partial regions, also with different signs of the curvature.

Alternatively or additionally, "convex" can mean that a minimum distance d is present between the observer and the lens field when the lens field is viewed at an angle $a0=0°$. For an actual distance D between the viewer and the lens field at an angle $a \neq a0$, the following applies preferably for all angles or on average: $D > 1/d \cos(a)$. Correspondingly, 'concave' can mean in respect of the light source and the lens field: $D < 1/d \cos(a)$.

The method may comprise the step of modulating an emission characteristic of the light source. The modulation can be carried out by switching on and/or switching off certain light-emitting components of the light source. It is likewise possible for the modulation to be carried out by an LCD unit or moving a beam of rays from the light source, in particular a laser beam bundle.

The individual lenses may only be partially illuminated by the light source. This means that in the representation of the three-dimensional image, for a specific pixel of the three-dimensional image, only a partial region of a light entrance surface of the corresponding individual lenses is illuminated by the light source. In this example, it is possible in principle for a plurality of different subregions of the individual lenses to be illuminated at a specific time, in particular to simultaneously generate a plurality of different image points of the image. Preferably, the individual lenses are not completely illuminated by the light source at any point in time.

The light from the light source may impinge on the individual lenses such that an emission characteristic of a three-dimensional object to be displayed is imitated by the individual lenses. For example, a light field is generated that corresponds to the light field emitted by a curved or bent surface. The three-dimensional impression of the image is generated via the emission characteristic.

The method may be configured for autostereoscopic imaging and comprise the following steps:

providing an autostereoscopic illumination unit having at least one light source and a lens field composed of many individual lenses or concave mirrors, wherein the lens field is preferably convexly curved viewed from the outside and is preferably concavely curved when viewed from the light source, and modulating an emission characteristic of the light source so that the individual lenses or the concave mirrors are only partially illuminated by the light source, in particular for each image point of an object to be displayed, wherein light from the light source impinges on the individual lenses or concave mirrors such that an emission characteristic of a three-dimensional object to be displayed is imitated by the individual lenses or concave mirrors.

Other possibilities for representing three-dimensional images are the use of 3D glasses. In this example, the right eye and the left eye of the observer obtain different images that together generate the 3D impression. The abbreviation 3D stands for three-dimensional. A disadvantage of such a solution is that spectacles are absolutely necessary which is undesirable in many applications. A further possibility for displaying 3D images is to give different images to the two eyes of the observer, by lenses and/or diaphragms. In this example, however, the 3D representation only functions for narrowly delimited positions of the observer. Otherwise, a complicated technology that determines the position of the observer and an adaptation of the 3D images thereto are necessary. Furthermore, it is possible to represent 3D images by laser diodes, wherein each image point is formed by a separate laser diode. However, this requires a very large number of laser diodes that makes a corresponding illumination unit cost-intensive and is also associated with a large space requirement and power consumption.

In our methods described here, on the other hand, a light source is used in front of which the lens field is located. The light is directed via the individual lenses in different directions for each individual image point. The directions of the individual beam bundles depend only on a relative position between the image point and the corresponding individual lens.

The individual lenses may be partially or completely or permanently sequentially irradiated. This does not necessarily exclude that a plurality of the individual lenses are irradiated in parallel or at the same time, in particular by different light sources. It is possible for only the predominant part of the individual lenses to be sequentially irradiated so that a smaller part of the individual lenses can be permanently irradiated. Particularly important or highlighted pixels such as corner points or edge points can be produced by the permanently irradiated individual lenses.

The light source may comprise one or more lasers or consist of one or more lasers. The laser or each of the lasers is preferably set up at a specific point in time to irradiate only one of the individual lenses. In other words, a 1:1 association with respect to the individual lenses is preferably provided for each laser in the time domain. It is also possible for a plurality of lasers to irradiate the same lens simultaneously or sequentially, for example, to increase a repetition frequency of the image. A laser beam can also be distributed onto a plurality of lenses, in particular by a beam splitter.

A virtual image of the three-dimensional object to be displayed may be generated by the lens field. Virtual images are images that cannot be displayed on a real screen.

The virtual image may be partially or completely located on the same side of the lens field as the light source. In particular, the virtual image is generated within the lens field, that is in a volume enclosed by the lens field. The virtual image can thus be restricted to an inner region of the illumination unit.

A real image of the three-dimensional object to be displayed may be generated by the lens field. A real image is an image that can be displayed on a screen or whose sectional representations can be displayed on a screen.

The real image may be partially or completely located on a side of the lens field facing away from the light source. The real image can be located partially or completely outside the illumination unit.

The virtual or real image may comprise a plurality of beam bundle nodes. In the beam bundle nodes, a plurality of beam bundles of the light generated by the light source and deflected by the individual lenses intersect in a virtual or real manner. It is possible for each image point of the three-dimensional object to be displayed to be formed by a beam bundle node. For each image point, each beam bundle originates from one of the individual lenses. This means that each beam bundle node is assembled by the beam bundles from a plurality of individual lenses. Each of the individual lenses is preferably used to generate a plurality of beam bundles for different beam bundle nodes, sequentially in time or even parallelly in time.

In spatial angle ranges that originate from object points of the three-dimensional object to be represented and in which the object is located between the object point in question and an observer, no light need be emitted. In this way, it is simulated that the corresponding object points appear hidden by the object from the viewpoint of the observer. If a corresponding object point is located, for example, on a rear side of the object that is assumed to be opaque, viewed from the viewer, the beam bundles are guided such that no ray bundles arrive at the viewer from the beam bundle node assigned to the object point. In other words, a shading and/or covering of regions of the object by the object itself is imitated.

The illumination unit may have a longitudinal axis. The longitudinal axis can be an axis of symmetry. For example, the lens field extends along the longitudinal axis and/or has its greatest geometric extent along the longitudinal axis.

The lens field may be oriented in places or overall parallel to the longitudinal axis. The lens field is, for example, an elongated body having a main direction of expansion parallel to the longitudinal axis.

An average diameter of the individual lenses may be at least 10 µm or 0.1 mm or 0.2 mm or 0.5 mm. Alternatively or additionally, the individual lenses have an average diameter of at most 5 mm or 2 mm or 1 mm.

The lens field may comprise at least 10,000 or 100,000 or 1,000,000 of the individual lenses. Alternatively or additionally, the lens field may comprise at most 10,000,000 or 3,000,000 or 500,000 of the individual lenses.

The lens field may have a mean diameter, in particular in the direction perpendicular to the longitudinal axis, of at least 0.2 m or 0.3 m. Alternatively or additionally, the mean diameter of the lens field may be at most 100 m or 5 m or 1 m or 0.7 m or 0.4 m. The same can apply to a height of the lens field, for example, along the longitudinal axis.

The light entrance surface of the individual lenses may be illuminated to at most 50% or 20% or 10% or 3% for each image point of the three-dimensional object to be displayed. Alternatively or additionally, this illumination proportion is at least 0.1% or 0.5% or 2% or 4%.

An average diameter of the beam bundles impinging on the individual lenses may be at most 20% or 10% or 5% of the average diameter of the individual lenses. Alternatively or additionally, this value is at least 2% or 5% or 10%.

The individual lenses may have a continuous, steady and contiguous curvature on a light exit surface and/or on the light entrance surface. In this example, sign changes of the curvature are preferably present neither at the light entrance surface nor at the light exit surface. Furthermore, the light entrance surface and/or the light exit surface are preferably kink-free. The individual lenses can be spherical or approximately spherical lenses. However, it is also possible to use aspherical lenses or Fresnel lenses or lenses having a gradual refractive index profile, also referred to as GRIN lenses.

The individual lenses may have a free-form surface or regions comprising a plurality of different curvatures, also curvatures with different signs from one another, at a light exit surface and/or on the light entrance surface. Also in a free-form surface, a direction of the curvature can change.

The light entrance surface and/or the light exit surface may be square, rectangular, hexagonal or also circular, seen in plan view. Alternatively, in a plan view, these surfaces can also be ovally or elliptically shaped.

The light source may be configured to emit red, green and blue light independently of one another. Alternatively or additionally, light sources can be used for individual or combined emission of yellow, orange, cyan, magenta or white light and/or emit ultraviolet and/or infrared radiation. The three-dimensional object to be displayed can be displayed in color for a viewer from the three primary colors.

The illumination unit may have a plurality of light sources. The light sources can be arranged stacked one on top of the other, in particular along the longitudinal axis.

All light sources of the illumination unit may be structurally identical to one another. Alternatively, it is possible for different types of light sources, for example, for the emission of different colors, to be used.

The lens field may have the shape of a hollow cylinder. In this example, the light source or the light sources is/are preferably partially or completely located within the hollow cylinder.

The lens field may be designed partially or completely in the form of a spherical surface. The spherical surface preferably extends over a solid angle range of at least 2 sr or 3 sr or 6 sr. Alternatively or additionally, the solid angle range is at 4 $\pi$ or is at most 10 sr or 8 sr. The spatial angle range relates in particular to a position of the at least one light source. It is possible for the at least one light source to be located partially or completely within the spherical surface.

The individual lenses may be distributed over the lens field, for example, distributed uniformly. The individual lenses can have approximately equally large light entrance surfaces.

Alternatively, it is possible for the individual lenses to be distributed non-uniformly and/or have light entrance surfaces of different sizes. In the latter example, the individual lenses can have solid angle regions of equal size or approximately equally large, with respect to the at least one light source. This means that the individual lenses, viewed from the light source, appear to be of equal size or approximately equally large.

It is possible for the lens field to be filled to at least 60% or 80% or 95% or completely by the individual lenses. This means that a radiation entrance surface of the lens field can be formed completely or almost completely by the light entrance surfaces of the individual lenses.

One of the light sources or all light sources or the light source may be rotated within the lens field. As a result, it is possible for the individual lenses to be sequentially irradiated and/or scanned. The individual lenses are then illuminated similarly to a so-called flying spot projector.

A plurality of the light sources may be arranged in a common plane, in particular in a plane perpendicular to the longitudinal axis. The light sources preferably rotate correlated to one another, in particular within this plane perpendicular to the longitudinal axis or approximately perpendicular to the longitudinal axis. In this example, a plurality of the light sources can be arranged next to one another. Alternatively or in addition to the at least one light source, a reflector can also rotate, in a manner similar to that in a lighthouse.

The illumination unit may additionally comprise one or more detectors. The at least one detector may be designed to detect light from the at least one light source.

The detector may be integrated into the lens field. For example, the detector can assume a position of one or more of the individual lenses. A surface of the detector is, relative to a total area of the lens field, preferably negligible and in particular at most 1% or 0.2% of the total area of the lens field.

The at least one detector may be periodically irradiated during the sequential illumination of the individual lenses. This applies in particular if a rotating light source is present. The light source can be calibrated by the periodic or approximately periodic illumination of the detector by the light source, in particular with regard to a position of a beam of rays generated by the light source and/or with regard to a rotational speed of the light source. Likewise, the detector allows the light source to be positioned more accurately relative to the individual lenses.

We also provide an autostereoscopic illumination unit. The illumination unit is configured to be operated using a method according to one or more of the examples described above. Features of the method are therefore also disclosed for the illumination unit and vice versa.

The individual lenses of the lens field may be designed as converging lenses. It is possible for the individual lenses to be shaped as plano-convex lenses or as biconvex lenses.

The illumination unit may comprise control electronics. The light source can be modulated with regard to its emission characteristic via the control electronics. By the control electronics, it is possible to output electronic signals to the light source and/or the lens field so that the three-dimensional object can be displayed.

The illumination unit may have one or more motors. The light source can be moved in particular via the at least one motor so that the individual lenses can be illuminated sequentially.

In the illumination unit, a region between the light source and the lens field may be aperture-free. In particular, there may be no parallax barriers between the light source and the lens field. The light source and the lens field are preferably also designed to be diaphragm-free.

The light source may have a comparatively small number of light sources, relative to a number of individual lenses. In particular, a quotient of the number of individual lenses and the number of light sources is at least 1 or 10 or $10^3$ or $10^4$ or $10^5$. Alternatively or additionally, this quotient is at most $10^7$ or $10^6$ or $10^5$.

It is possible for the illumination unit to have at least five or 20 or 50 of the light sources. Alternatively or additionally, the number of light sources is at most 500 or 100 or 25. In this sense, partial light sources for red, green and blue light can be combined to form a single light source for tunable colored and/or white light.

The illumination unit is designed, for example, as a head-up display or integrated into such a display, for example, in a means of transport such as a car. Furthermore, the illumination unit can be integrated into 3D spectacles or virtual reality spectacles in which the illumination unit is located relatively close to the eye of the observer and/or arches around the observer. Compared to conventional 3D spectacles, the 3D image can be explored with the movement of the eyes of the customer only, that is to say even without head rotation.

Our methods and illumination units are explained in more detail below with reference to the drawings on the basis of examples. Identical reference signs indicate the same elements in the individual figures. In this case, however, no relationships to scale are shown. Instead, individual elements can be represented with an exaggerated size in order to afford a better understanding.

FIG. 1A shows a sectional representation perpendicular to a longitudinal axis L of an illumination unit 1, and FIG. 1B, a sectional representation parallel to the longitudinal axis L. The illumination unit 1 is designed for autostereoscopic displaying of three-dimensional images.

The illumination unit 1 comprises a light source 2, preferably a semiconductor laser. The light source 2 is mounted within a lens field 3 to be rotatable about the longitudinal axis L. Beam bundles 6 are generated by the light source 2, the beam bundles 6 having a comparatively small diameter and being directed onto individual lenses 33 of the lens field 3. The individual lenses 33 have a larger diameter than the beam bundles 6. By rotation of the light source 2 around the longitudinal axis L, the individual lenses 33 are scanned in series and sequentially illuminated in part. To control the light source 2, control electronics 8 are provided, which can also be located within the lens field 3. A motor that rotates the light source can be integrated in the control electronics 8. A direction of rotation R is symbolized by an arcuate arrow.

The lens field 3 is designed as a hollow cylinder. The individual lenses 33 are arranged to be uniformly distributed over the lens field 3. The light source 2 is located within the hollow cylinder so that light entrance surfaces 34 of the individual lenses 33 face the light source 2 and light exit surfaces 35 face outwards. For an external viewer, not shown, the lens field 3 appears convexly curved.

Figure 1:
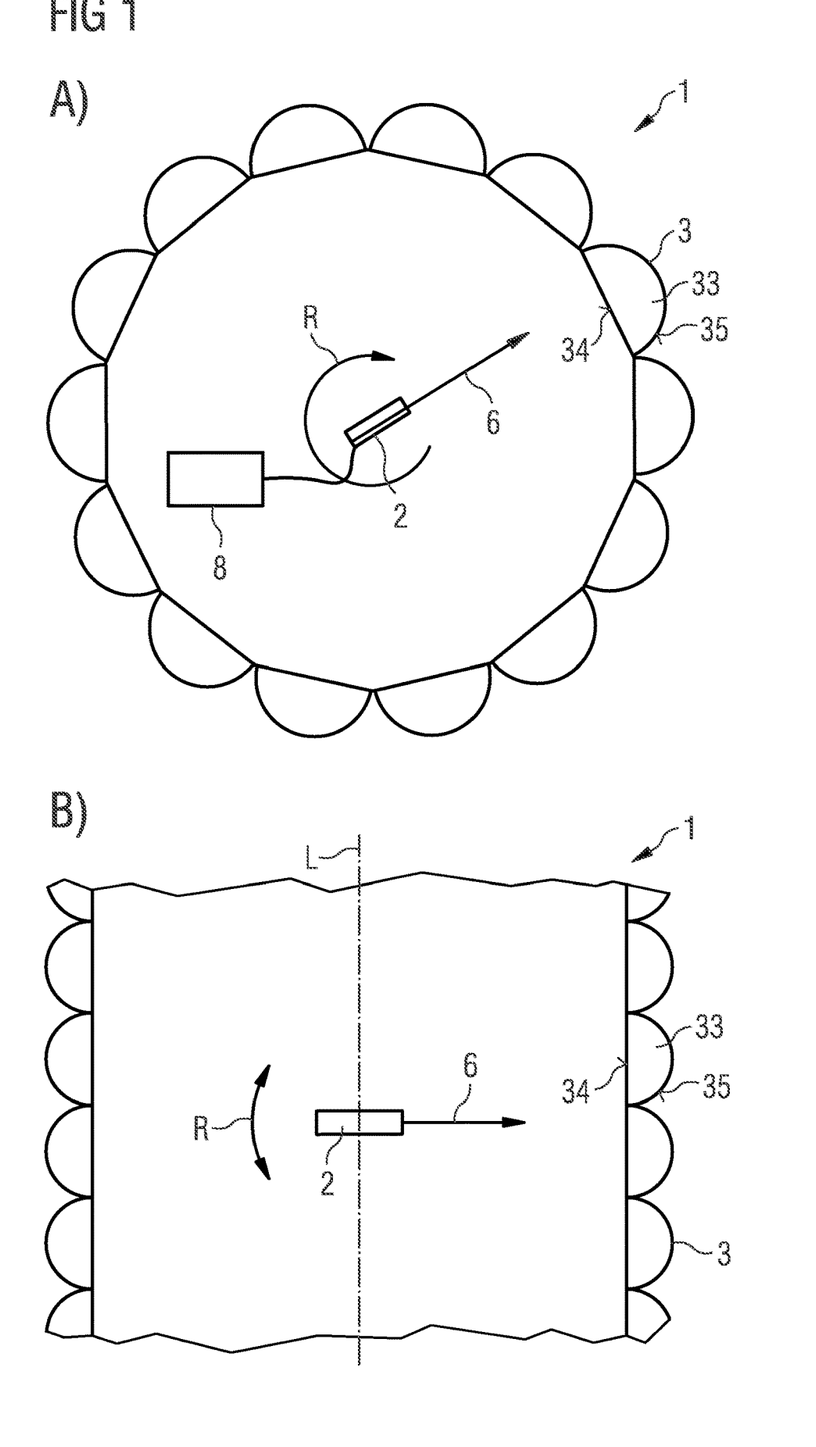
FIGS. 1A, 1B, 2 and 6 to 15 show schematic sectional representations of examples of autostereoscopic illumination units.
Figure 2:
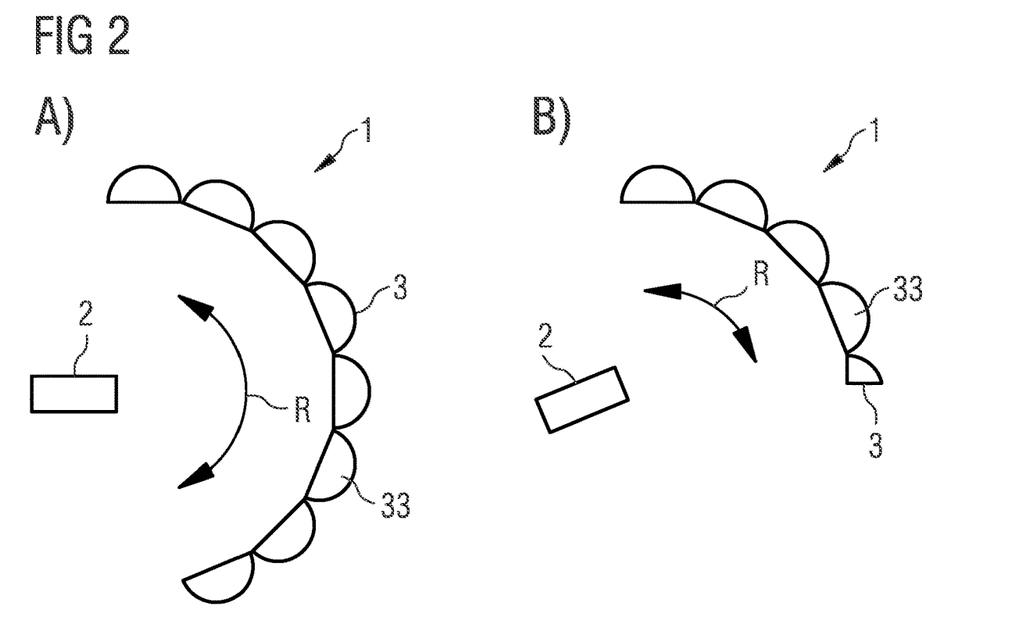

In FIG. 2, a further example of the illumination unit 1 is illustrated in sectional representations corresponding to FIG. 1. The lens field 3 is designed as a quarter of a spherical surface and covers a spatial angle range of it with respect to the light source 2.

Figure 3:
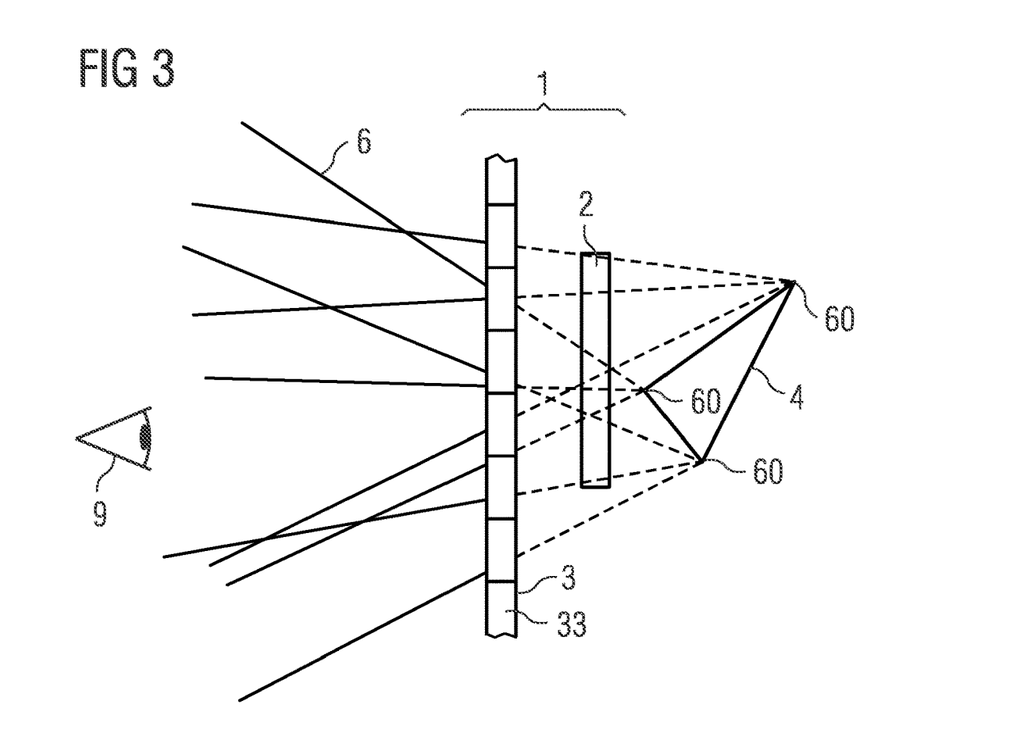
FIGS. 3 to 5 show schematic sectional representations of examples of methods of operating autostereoscopic illumination units.

FIG. 3 schematically illustrates the generation of three-dimensional images with such an illumination unit 1 for a viewer 9. Light which is deflected by the lens field 3 is generated by the light source 2. A virtual image 4 of a three-dimensional object to be represented is generated by the individual beam bundles 6. The individual beam bundles 6 intersect in virtual beam bundle nodes 60 of the virtual image 4. To simplify the representation, the beam bundle nodes 60 are drawn only at corner points of the virtual image 4. Beam bundle nodes are preferably located on the entire surface of the image and thus correspond to the three-dimensional object.

Since the beam bundle nodes 60 and thus the virtual intersection points of the beam bundles 6 lie on the same side of the lens field 3 as the light source 2, the image is a virtual image. In this example, it is possible for the light source 2 to be located between the virtual image and the lens field 3. As an alternative to the representation in FIG. 3, the virtual image 4 can also lie between the light source 2 and the lens field 3. Furthermore, it is possible, as in all other examples that the represented object can also be located on the lens field 3 in the sense that the lens field 3 intersects the object.

In FIG. 3, the virtual image 4 is shown in accordance with the sectional representation in FIG. 1B. The same applies in a sectional view, not illustrated in FIG. 3, analogous to FIG. 1A. Equally, the following virtual or real images 5 are also drawn only for the view of FIG. 1B to simplify the representation. In addition, the subsequent different light sources 2 are each illustrated for real images 5. However, such light sources can equally also be used in combination with the associated lens field 3 to generate virtual images.

Figure 4:
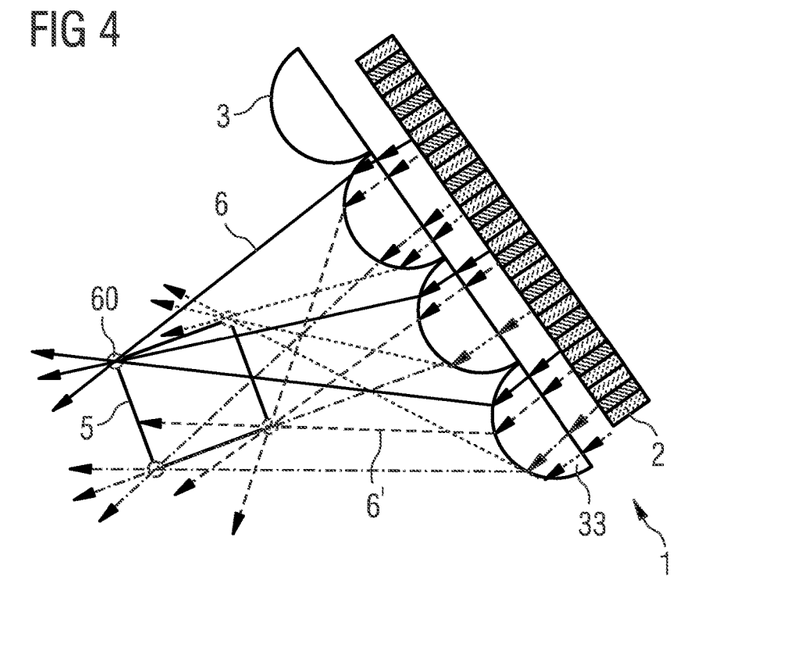

According to FIG. 4, the light source 2 is formed by a field of individual emitters, for example, light-emitting diodes or laser diodes. Deviating from the representation in FIG. 4, it is possible for individual emitters to be assigned to a plurality of individual lenses 33.

According to FIG. 4, the beam bundle nodes 60 are located on a side of the lens field 3 facing away from the light source 2 and thus on the side of the observer 9. A real image 5 is generated.

As in all other examples, preferably only such beam bundles 6 are emitted by the lens field 3 in which no shading is effected by the object to be displayed itself. Thus, no forbidden beam bundles 6' occur, as illustrated by way of example in FIG. 4, which run through the object to be displayed, at least when the object to be displayed is opaque.

As in all other examples, the beam shaping by the individual lenses 33 is illustrated only roughly schematically and without taking into account the actually light-refracting surface.

The light source 2 is preferably located in a focal plane of the lens field 3, as can also be the case in all other exemplary embodiments, in particular for real images 5.

Figure 5:
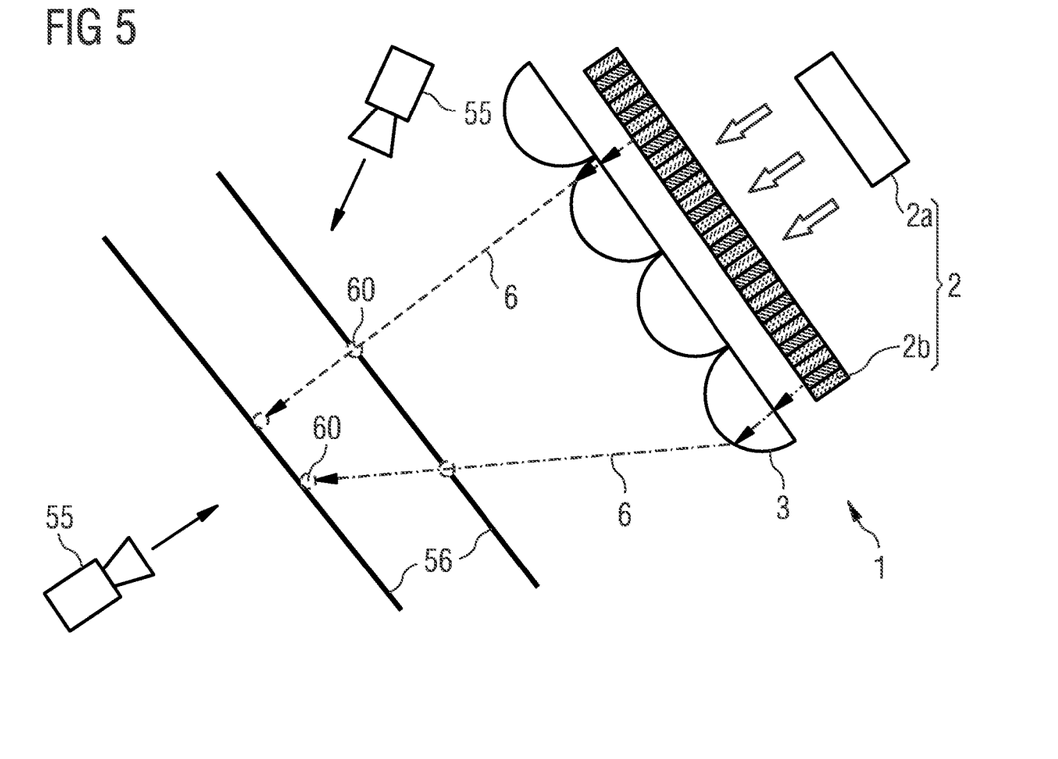

In the example of FIG. 5, the light source 2 is composed of an emitter 2a and a liquid crystal panel 2b, also referred to as an LCD.

Furthermore, FIG. 5 illustrates how a calibration of the illumination unit 1 can be achieved, in particular in the case of real images. Thus, a plurality of partially transmissive screens 56 can be used at different distances from the lens field 3. Detectors such as cameras 55 can be used to determine where the beam bundle nodes 60 are located. Thus, for each image point of the three-dimensional object to be represented, both a starting point and a direction of the associated beam bundle 6 can be determined by the lens field 3.

An analogous method can also be done with only one screen which is movably mounted relative to the lens field 3 so that camera images are recorded by only one camera 55 at different distances from the lens field 3. In this example, the screen does not have to be partially transparent.

Corresponding calibration methods can also be used in all other examples.

Figure 6:
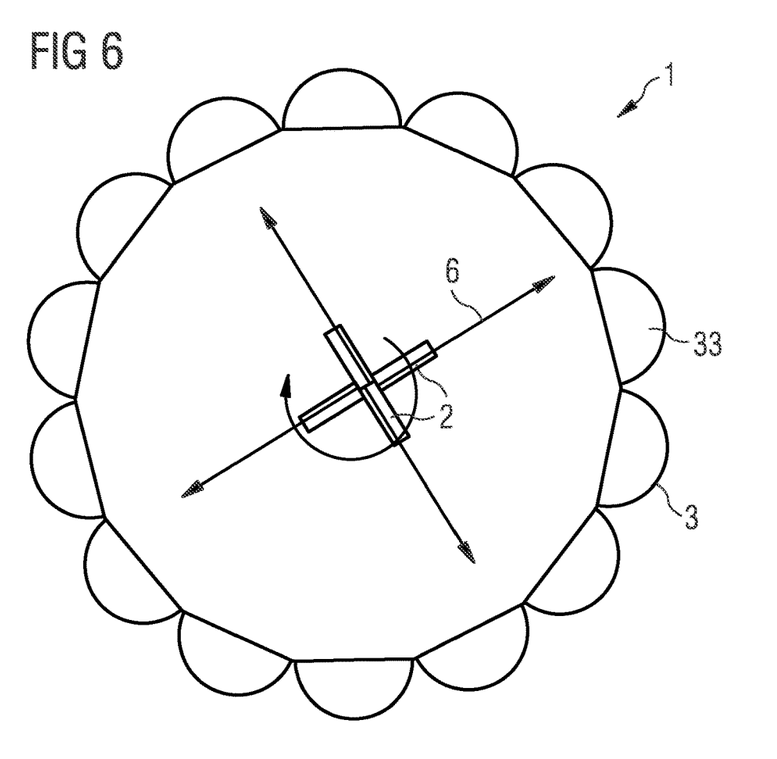

In the sectional representation perpendicular to the longitudinal axis L of FIG. 6, it is shown that a plurality of the light sources 2 are located in one plane. Viewed in a plan view, the light sources 2 preferably rotate rigidly relative to one another around the longitudinal axis L. As a result, an increased image repetition rate and/or a larger number of image points can be achieved. Alternatively, a rotational speed of the light sources 2 can be reduced. A motor that rotates the light sources 2 is not shown to simplify the representation.

It is also possible for a plurality of light sources to be situated closely next to one another so that these illuminate closely adjacent pixels. The repetition frequency per light source is thus reduced. This is also possible in all other examples.

Figure 7:
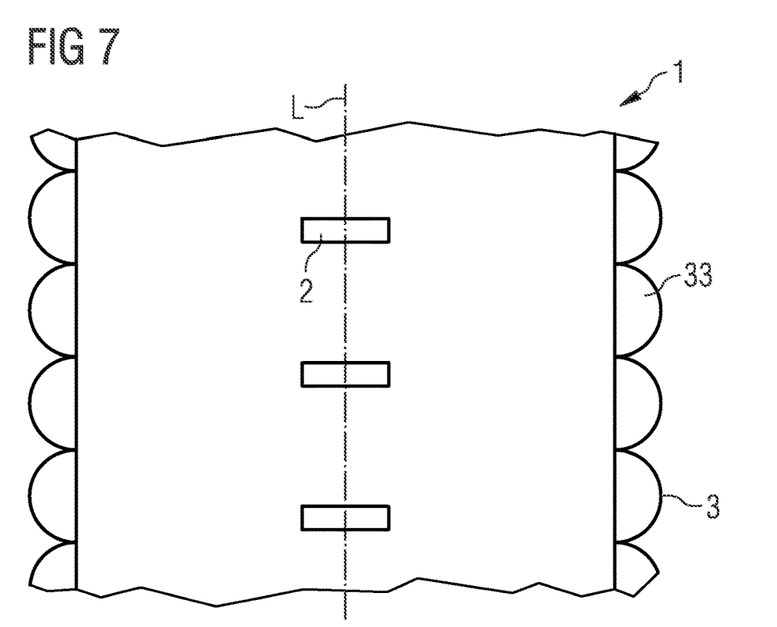

In the example of FIG. 7, a plurality of the light sources 2 are arranged stacked one on top of the other along the longitudinal axis L. In this way, a higher resolution can also be achieved. Each of the light sources 2 is preferably provided for illuminating a plurality of rows of the individual lenses 33 along the longitudinal axis L.

The arrangement of FIG. 7 can preferably be combined with the arrangement of FIG. 6 so that several of the light sources can be arranged in a plurality of planes perpendicular to the longitudinal axis L.

Figure 8:
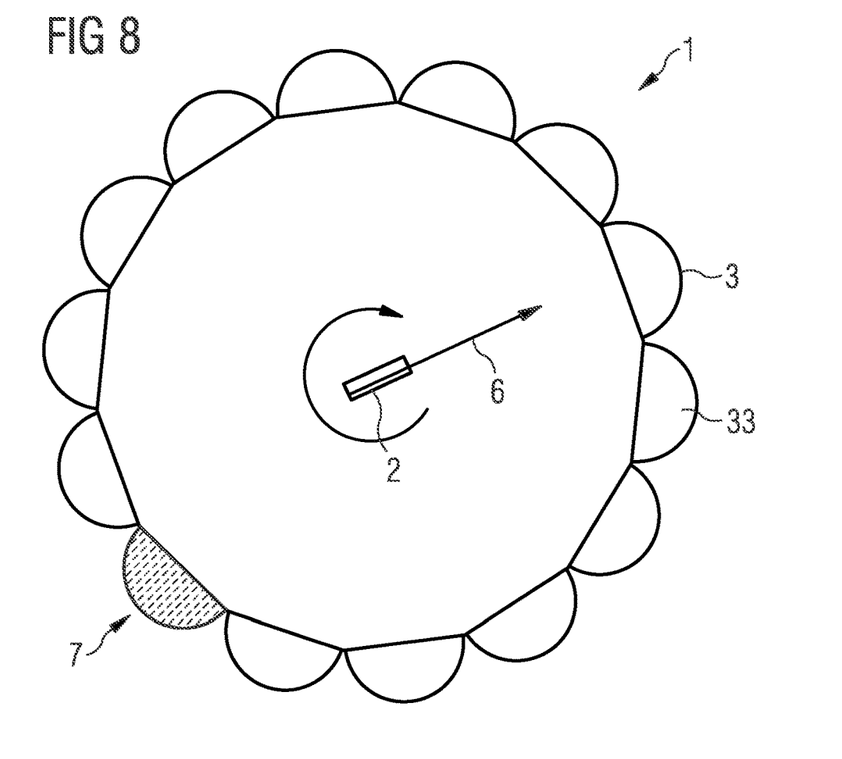

In the example of FIG. 8 it is shown that a detector 7 is integrated into the lens field 3. The detector 7 can be introduced instead of one or instead of several of the individual lenses 33. A calibration of the modulation of the rotating light source 2 is carried out with such a detector 7, in particular of a laser diode, with respect to the lens field 3. In contrast to the representation of FIG. 8, a plurality of the detectors 7 can also be present within a plane perpendicular to the longitudinal axis and/or along the longitudinal axis.

Figure 9:
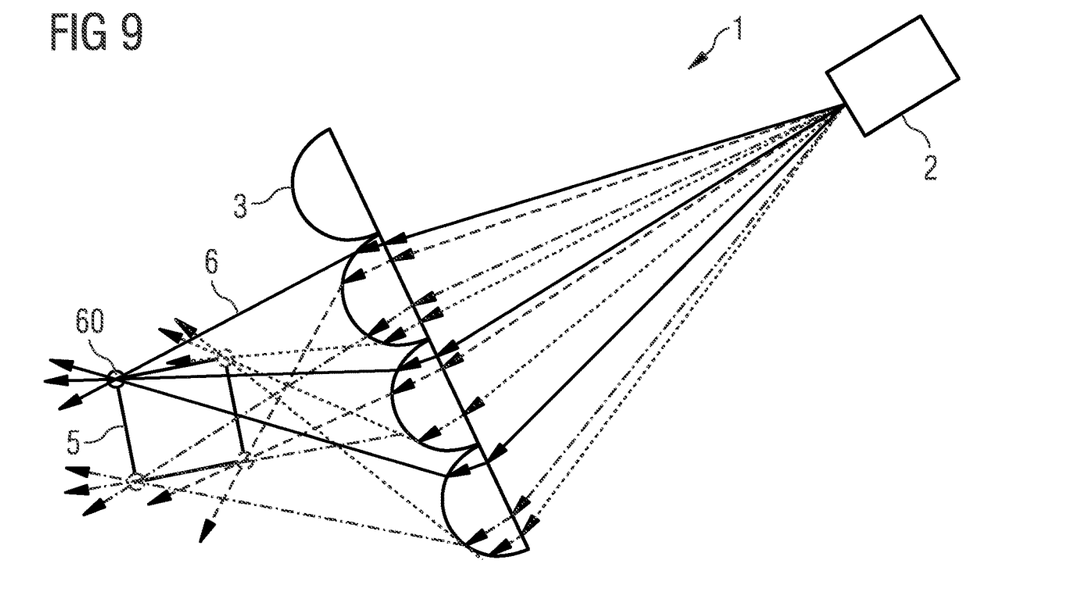

FIG. 9 illustrates that the light source 2 is a red, green and blue-emitting radiation source, also referred to as an RGB unit. For example, the light source 2 is an LCD beamer, a laser beamer or a cinema projector. A laser beamer is preferably used.

Figure 10:
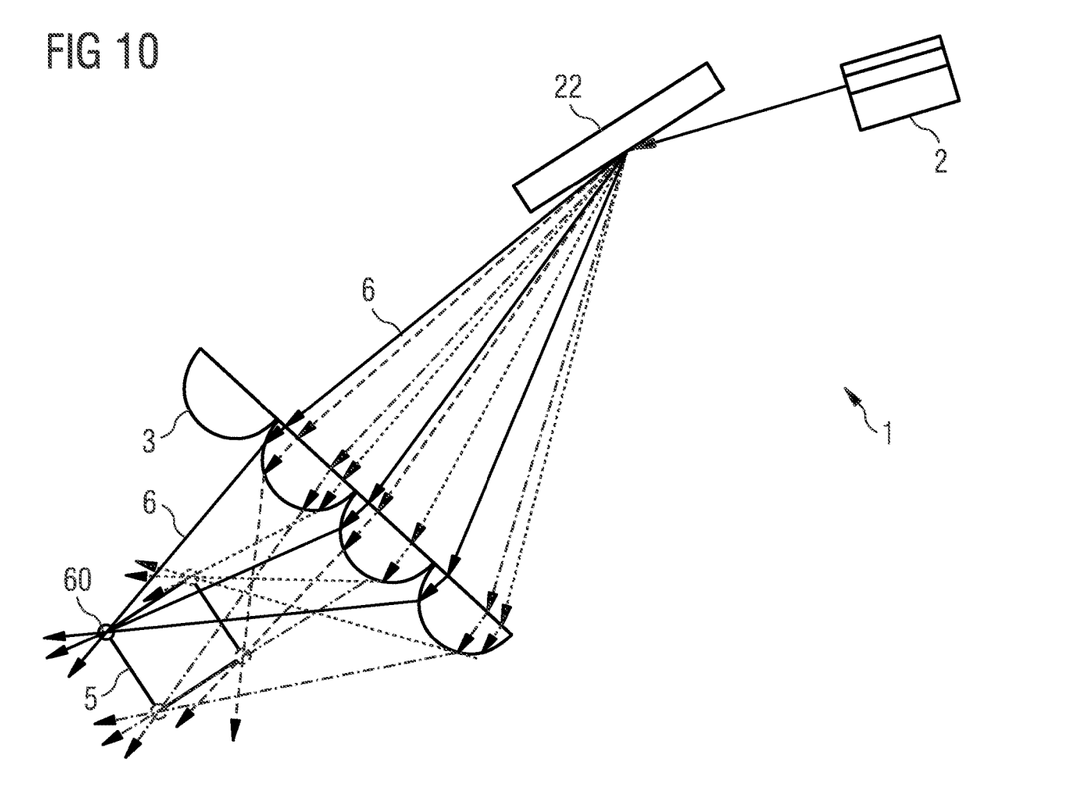

According to FIG. 10, an RGB laser 2 is used as the light source, the light of which is deflected onto the lens field 3 by a quickly tiltable electromechanic mirror 22, also referred to as a MEMS mirror. Depending on the point of incidence of the beam bundles 6, each of the individual lenses 33 deflects the laser beam in a different, predefined direction. The emission characteristic of the 3D object to be displayed is reproduced by this flying spot scanning of the individual lenses. In this example, each color of the light source 2 can preferably be controlled separately so that a colored image 4, 5 is produced.

Figure 11:
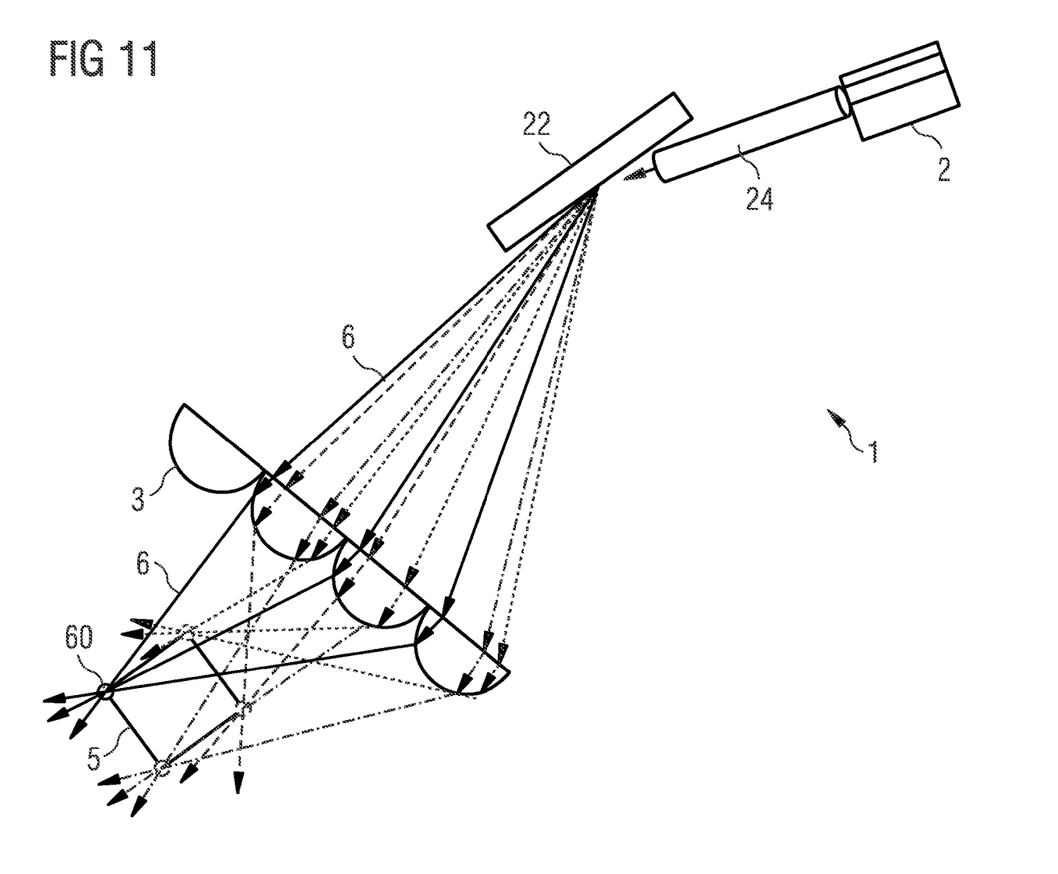

In the example of FIG. 11, the mirror 22 is connected to the light source 2 via a fibre coupling 24, and not through a free-beam path as in FIG. 10.

Figure 12:
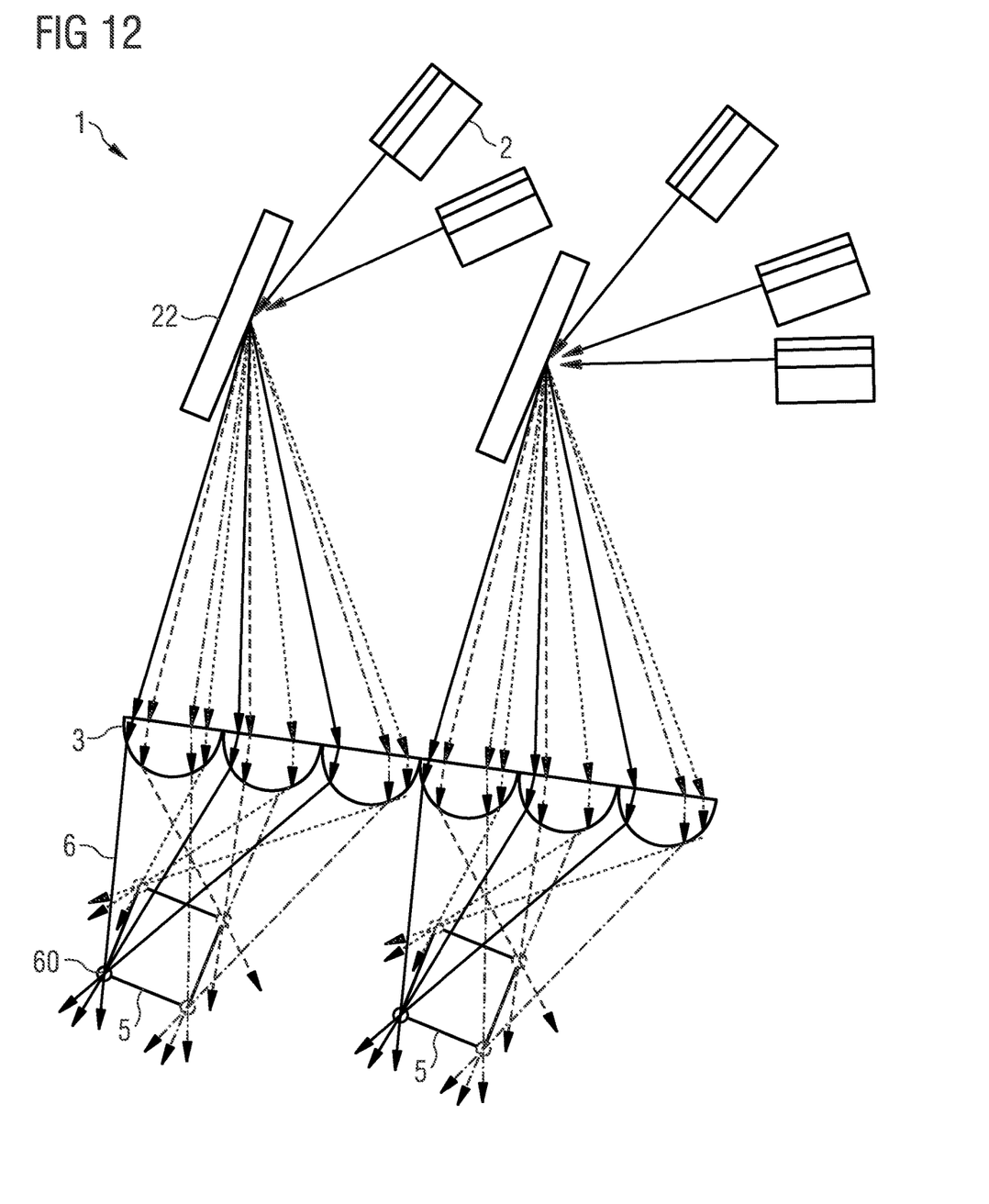

In the example of FIG. 12, it is illustrated that each of the movable mirrors 22 is connected to a plurality of light sources 2, for example, to two or three of the light sources 2. As a result, an emission angle of the movable mirror 22 can be increased. Thus, a size of a displayed region and/or the resolution can be increased. A plurality of such units comprising light sources 2 and movable mirrors 22 can be combined with one another to construct the illumination unit 1.

Figure 13:
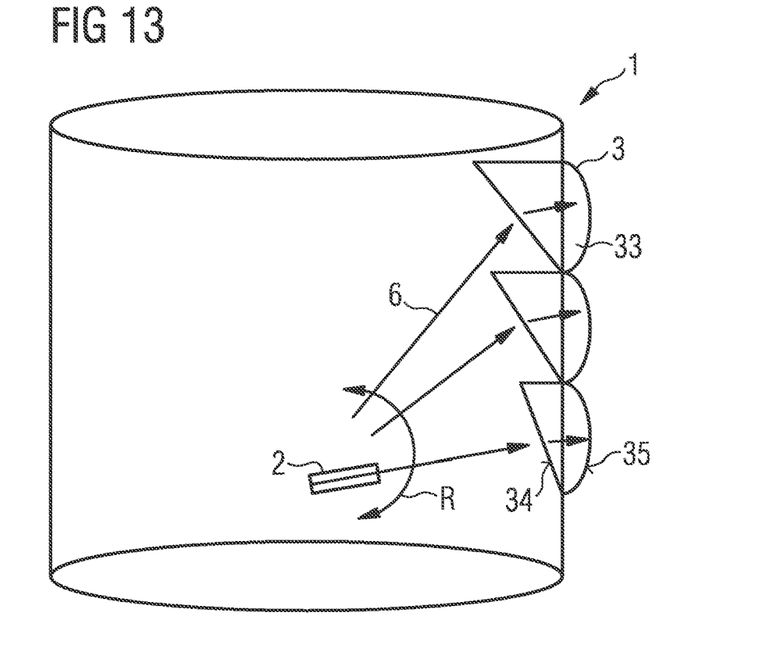

According to FIG. 13, all or at least those individual lenses 33 of the lens field 3 lying further away from the light source 2 have light entrance surfaces 34 tilted relative to a lateral surface of the lens field 3. As a result, a more favorable entry angle for the beam bundles 6 can be achieved. In the direction away from the light source 2, the relative inclination of the light entrance surfaces 34 preferably increases. In projection onto the lateral surface of the lens field 3, all individual lenses 33 can be of equal size.

Figure 14:
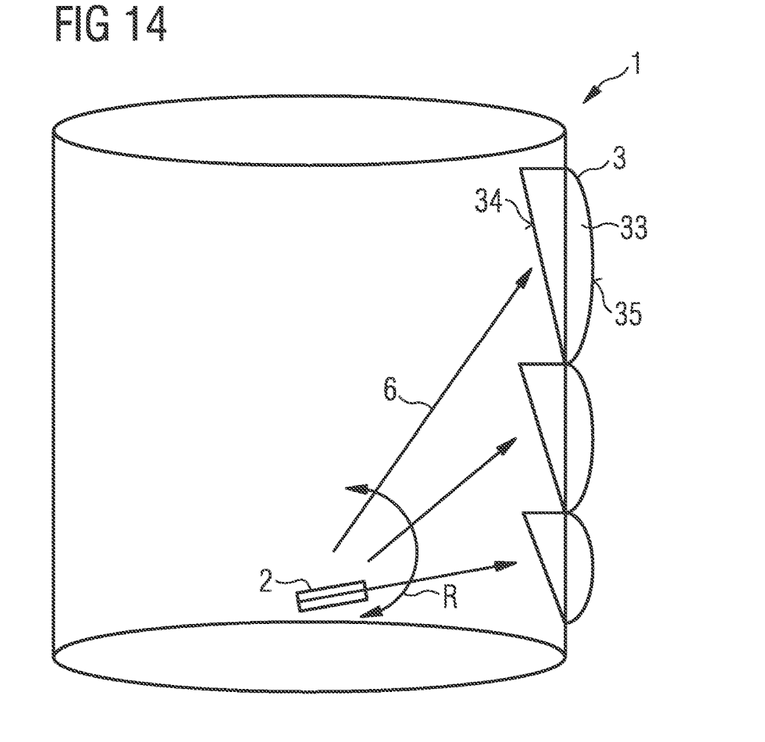

In the example of FIG. 14, on the other hand, the individual lenses 33 further remote from the light source 2 are increasingly larger in projection onto the lateral surface of the lens field 3. Thus, all individual lenses 33, viewed from the light source 2, can take up equally large spatial angle ranges and thus appear to be of equal size. Optionally, the light entrance surfaces 34 can be inclined, as explained in conjunction with FIG. 13. Deviating from the representation in FIG. 14, it is possible that the light entrance surfaces 34 run parallel to the lateral surface and/or are convexly curved.

Figure 15:
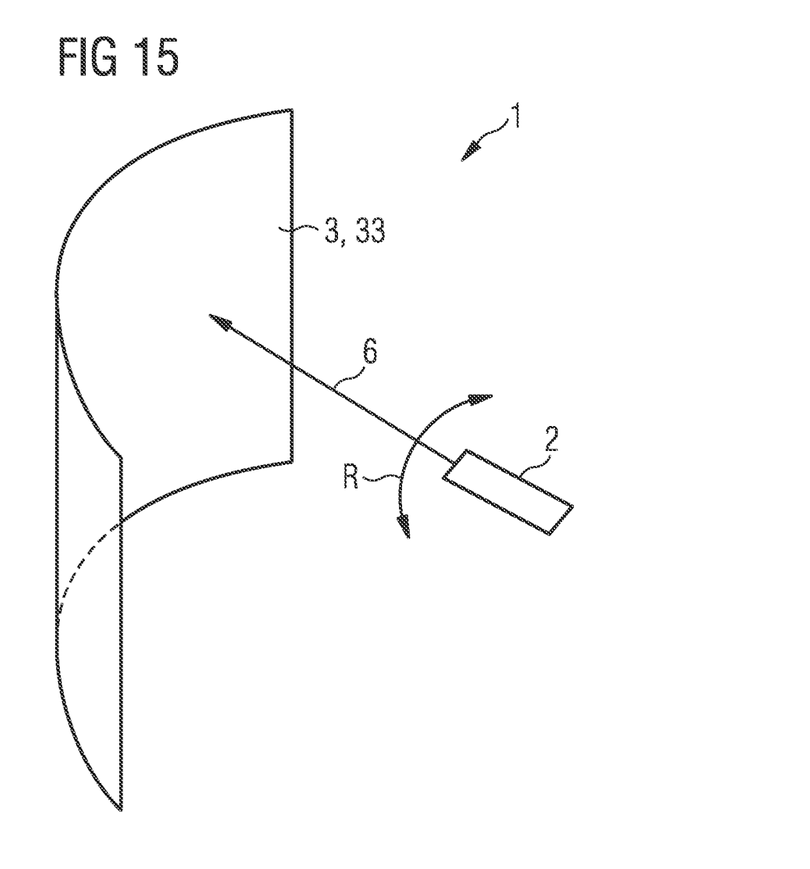

Finally, in the example of FIG. 15 it is illustrated that, instead of individual lenses, the lens field 3 can also be formed by concave mirrors. The optical function of the concave mirrors is identical to the optical function of the individual lenses, with the difference that the light source 2 or the light sources 2 is/are located on the same side of the lens field 3 as the observer, not shown. The virtual or real 3D images generated by the lens field 3 during operation thus also lie on the same side as the light source 2. The light source 2 and the observer (not shown) are usually located at different distances from the lens field 3. The lateral surface of the lens field 3 of FIG. 15 is formed, for example, in accordance with the other examples by part of a cylinder casing or a spherical surface.

As already explained in conjunction with FIG. 4, the arrangements of the FIGS. 4, 5 and 9 to 14 can also be used to generate virtual images within the, for example, cylindrical or spherical lens field 3. In addition, to simplify the representation, in FIGS. 4, 5 and 9 to 15 in each example only a sectional representation along the longitudinal axis is shown, as illustrated in FIG. 1B. The imaging in planes perpendicular to the longitudinal axis L takes place in the same way. The light sources 2 and optional further components such as the LCD unit 2b or the movable mirrors 22 are preferably each completely surrounded by the lens field 3. The lens field 3 can thus simultaneously serve as a housing and/or as a cover for the light source 2 and the associated components.

In the drawings, the individual lenses 33 are each drawn as plano-convex lenses. It is likewise possible to use biconvex lenses. In addition, it is possible for mainly the light entrance surfaces 34 to be functionalized as converging lenses, whereas the light exit surfaces 35 are designed as an adapted outer contour line of the lens field 3. In other words, an outer surface of the lens field can then be designed as a smooth spherical surface, conical surface or cylinder jacket.

Our methods and units are not restricted by the description on the basis of the examples. Rather, this disclosure encompasses any new feature and also any combination of features that includes, in particular, any combination of features in the appended claims, even if the feature or combination itself is not explicitly specified in the claims or examples.

This application claims priority of DE 10 2016 113 669.7, the subject matter of which is incorporated herein by reference.

What is claimed is:

1. A method of autostereoscopic imaging comprising:
providing an autostereoscopic illumination unit comprising at least one light source and comprising a lens field composed of a multiplicity of individual lenses or a multiplicity of concave mirrors, and
modulating an emission characteristic of the light source such that the individual lenses or the concave mirrors are illuminated only partly by the light source,
wherein
light from the light source impinges on the individual lenses or concave mirrors such that by the individual lenses or concave mirrors an emission characteristic of a three-dimensional object to be displayed is imitated,
the lens field extends over a spatial angle range of at least 2 sr relative to the light source or an external observer,
the individual lenses or concave mirrors are distributed over the lens field,
the individual lenses or concave mirrors are at least partially sequentially irradiated,
the light source is formed by one or more lasers and the laser or each of the lasers irradiates/irradiate only one of the individual lenses at a specific point in time,
the illumination unit has a longitudinal axis oriented parallel to the lens field,
an average diameter of the individual lenses is 10 µm to 2 mm,
light entrance surfaces of the individual lenses are illuminated to at most 10% by the light source, and
the light source emits red, green and blue light and the three-dimensional object is represented in color.

2. The method according to claim 1, wherein the individual lenses constitute the lens field, and the lens field is continuously or in approximation curved in a convex manner from an exterior view and is concavely curved when viewed from the light source.

3. The method according to claim 2, wherein a virtual image of the object is generated by the lens field, and the virtual image lies at least partially on the same side of the lens field as the light source.

4. The method according to claim 3, wherein the virtual image comprises a plurality of beam bundle nodes in which a plurality of beam bundles of the light generated by the light source and deflected by the individual lenses.

5. The method according to claim 2, wherein a real image of the object is generated by the lens field, and the real image lies at least partially on a side of the lens field facing away from the light source.

6. The method according to claim 5, wherein the real image comprises a plurality of beam bundle nodes in which a plurality of beam bundles of the light generated by the light source and deflected by the individual lenses.

7. The method according to claim 2, wherein the lens field is a hollow body is shaped and the individual lenses are uniformly distributed over a casing of the hollow body, and the lens field extends over a spatial angle range of at least 4 sr relative to the light source or the external observer.

8. The method according to claim 2, wherein the lens field is shaped as a sphere over a solid angle range of at least 6 sr, the at least one light source is located within the sphere, and the individual lenses are uniformly distributed over a spherical surface of the sphere.

9. The method according to claim 2, wherein the light source or at least one of the light sources is/are moved and/or rotated within the lens field so that the individual lenses are sequentially irradiated.

10. The method according to claim 9, wherein a plurality of light sources are arranged in a common plane, the light sources rotating together.

11. The method according to claim 1, wherein in spatial angle regions that originate from object points of the three-dimensional object to be represented and in which the object is located between the relevant object point and an observer, no light is emitted so that the object points appear hidden by the object.

12. The method according to claim 1, wherein several of the light sources are arranged stacked one on top of the other along the longitudinal axis (L), and the light sources are structurally identical.

13. The method according to claim 1, wherein the lens field is shaped as a hollow cylinder within which the at least one light source is located, and the individual lenses are uniformly distributed over a cylinder jacket of the hollow cylinder.

14. The method according to claim 1, wherein the illumination unit additionally comprises at least one detector, the detector is integrated in the lens field and the at least one light source periodically illuminates the detector so that the light source can be calibrated with the detector.

15. An autostereoscopic illumination unit comprising:
at least one light source,
a lens field formed continuously from a multiplicity of individual lenses configured as converging lenses, and control electronics,
wherein the light source is configured to only partially illuminate each one of the individual lenses,
the illumination unit has a longitudinal axis oriented parallel to the lens field,
an average diameter of the individual lenses is 10 μm to 2 mm,
the light source is configured to illuminate at most 10% of light entrance surfaces of the individual lenses, and
the light source is configured to emit red, green and blue light.

16. The illumination unit according to claim 15, wherein a region between the light source and the lens field is free of apertures, the lens field, viewed from an exterior, is curved convexly and, viewed from the light source, is curved concavely, and a quotient of a number of individual lenses and a number of light sources is 10 to $10^7$.

17. A method of autostereoscopic imaging comprising:
providing an autostereoscopic illumination unit comprising at least one light source and comprising a lens field composed of a multiplicity of individual lenses or a multiplicity of concave mirrors and at least one detector, and
modulating an emission characteristic of the light source such that the individual lenses or the concave mirrors are illuminated only partly by the light source,
wherein
light from the light source impinges on the individual lenses or concave mirrors such that by the individual lenses or concave mirrors an emission characteristic of a three-dimensional object to be displayed is imitated,
the lens field extends over a spatial angle range of at least 2 sr relative to the light source or an external observer,
the individual lenses or concave mirrors are distributed over the lens field,
the individual lenses or concave mirrors are at least partially sequentially irradiated, and
the detector is integrated in the lens field and the at least one light source periodically illuminates the detector so that the light source can be calibrated with the detector.

* * * * *